(12) United States Patent
Gonze et al.

(10) Patent No.: US 11,072,259 B2
(45) Date of Patent: Jul. 27, 2021

(54) VEHICLE THERMAL SYSTEMS LOW TO HIGH QUALITY ENERGY MANAGEMENT, STORAGE, RECOVERY, AND OPTIMIZATION

(71) Applicant: GM Global Technology Operations LLC, Detroit, MI (US)

(72) Inventors: Eugene V. Gonze, Pinckney, MI (US); Lawrence P. Ziehr, Clarkston, MI (US); Satish P. Ketkar, Troy, MI (US); Michael H. Carlson, Farmington Hills, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 136 days.

(21) Appl. No.: 15/939,709

(22) Filed: Mar. 29, 2018

(65) Prior Publication Data
US 2019/0299791 A1 Oct. 3, 2019

(51) Int. Cl.
*B60L 58/24* (2019.01)
*B60L 7/18* (2006.01)
*B60H 1/00* (2006.01)

(52) U.S. Cl.
CPC .......... *B60L 58/24* (2019.02); *B60H 1/00278* (2013.01); *B60H 1/00385* (2013.01); *B60L 7/18* (2013.01); *B60H 2001/00307* (2013.01); *B60L 2240/36* (2013.01); *B60L 2240/425* (2013.01)

(58) Field of Classification Search
CPC ........ B60L 58/24; B60L 7/18; B60L 2240/36; B60L 2240/425; B60H 1/00278; B60H 1/00385; B60H 2001/00307
See application file for complete search history.

(56) References Cited

U.S. PATENT DOCUMENTS

| | | | | |
|---|---|---|---|---|
| 6,029,465 A | * | 2/2000 | Bascobert | B60H 1/321 62/151 |
| 8,901,861 B2 | * | 12/2014 | Luke | B60L 58/16 318/376 |
| 9,379,559 B2 | * | 6/2016 | O'Connell | B60L 53/305 |
| 2009/0056670 A1 | * | 3/2009 | Zhao | F02B 47/08 123/25 P |
| 2014/0060086 A1 | * | 3/2014 | Ranalli | B60H 1/00478 62/3.3 |
| 2014/0316630 A1 | * | 10/2014 | Kohlberger | B60L 1/003 701/22 |

(Continued)

Primary Examiner — Hunter B Lonsberry
Assistant Examiner — Elizabeth Yang
(74) Attorney, Agent, or Firm — Vivacqua Crane (57) ABSTRACT

A method for continuously managing thermal energy in a motor vehicle includes initializing a continuous thermal energy management control loop within a controller disposed in the motor vehicle, calculating a quantity of stored energy in a thermal management system equipped to the motor vehicle, calculating a quantity of thermal energy waste in the thermal management system, determining if thermal energy is needed within a component of the thermal management system, selectively generating thermal energy, selectively transporting thermal energy to the component of the thermal management system, determining a thermal storage capacity of the thermal management system, determining if a thermal energy deficit exists within the thermal management system, and directing a flow of a thermal energy carrying liquid to a thermal energy reservoir.

16 Claims, 3 Drawing Sheets

(56) References Cited

U.S. PATENT DOCUMENTS

| | | | |
|---|---|---|---|
| 2015/0143806 A1* | 5/2015 | Friesth | F01K 3/00 |
| | | | 60/517 |
| 2016/0355068 A1* | 12/2016 | Sutherland | B60H 1/00392 |
| 2017/0297414 A1* | 10/2017 | Beloe | B60H 1/323 |
| 2019/0070924 A1* | 3/2019 | Mancini | B60L 58/26 |

* cited by examiner

VEHICLE THERMAL SYSTEMS LOW TO HIGH QUALITY ENERGY MANAGEMENT, STORAGE, RECOVERY, AND OPTIMIZATION

INTRODUCTION

The statements in this section merely provide background information related to the present disclosure, and may not constitute prior art.

The present disclosure relates to motor vehicle thermal management systems, and more specifically to systems and methods for controlling the operation of thermal energy sources and sinks within a motor vehicle. Emissions standards, environmental concerns, and operator perceptions of responsiveness, smoothness and noise, vibration, and harshness (NVH), as well as operator comfort dictate many of the ways in which thermal energy within a motor vehicle is controlled. Traditionally, efficiencies have been sought within the confines of the internal combustion engines (ICE) functioning as prime movers for motor vehicles. Such advances have generally taken the form of improving combustion efficiency (maximizing combustion energy conversion into motive force), scavenging combustion thermal energy to run HVAC functions, scavenging braking kinetic energy for battery recharging, and the like. The scavenging functions are often performed on dedicated heating, cooling, or electrical circuits, leading to a relatively complex series of circuits, many of which function almost entirely independent of one another.

However, even though ICEs have, and will likely continue to become, more and more efficient, substantial quantities of thermal energy are generated by the ICEs, a significant amount of which is usually rejected to the vehicle's surroundings. That is, in an ICE-powered vehicle, a surplus of thermal energy is generated by the ICE, and cannot be effectively or efficiently contained within the motor vehicle. Thus, a significant amount of so-called "high quality" thermal energy is often rejected from the motor vehicle to the atmosphere. In an attempt to mitigate the inefficient use of ICEs, and to lower emissions, reduce environmental impact, and improve responsiveness, smoothness, NVH, and operator comfort, motor vehicles are increasingly relying upon electrical power for both motivation as well as management of the passenger compartment environment. However, the increasing use of electrical power, as is produced by innovative propulsion systems such as hybrid systems, batteries, fuel cells and the like, has dramatically reduced the amount, and the quality of the thermal energy generated by vehicles equipped with such innovative propulsion systems.

Accordingly, while traditional systems and methods of thermal management originally designed for ICE systems can be applied to innovative propulsion systems, the surplus of thermal energy is much smaller than in an ICE system. Therefore, while traditional systems and methods of thermal management can operate for their intended purpose in ICE systems, there is a need for improved systems and methods of thermal management for vehicles in which the use of ICEs is reduced, and/or eliminated entirely. Thus, there is a need in the art for new and improved thermal management systems and methods which efficiently collect, store, and distribute thermal energy to vehicle systems that need such energy, while reducing hardware cost and complexity, improving reliability, and offering improved safety and redundancy, and reduced range anxiety for motor vehicle operators.

SUMMARY

According to several aspects of the present disclosure a method for continuously managing thermal energy in a motor vehicle includes initializing a continuous thermal energy management control loop within a controller disposed in the motor vehicle, calculating a quantity of stored energy in a thermal management system equipped to the motor vehicle, calculating a quantity of thermal energy waste in the thermal management system, determining if thermal energy is needed within a component of the thermal management system, selectively generating thermal energy, selectively transporting thermal energy to the component of the thermal management system, determining a thermal storage capacity of the thermal management system, determining if a thermal energy deficit exists within the thermal management system, and selectively directing a flow of a thermal energy carrying liquid to a thermal energy reservoir.

In another aspect of the present disclosure calculating a quantity of stored energy in a thermal management system further includes calculating a quantity of thermal energy stored in each of a plurality of dissimilar thermal fluid loops within the thermal management system.

In yet another aspect of the present disclosure each of the plurality of dissimilar thermal fluid loops includes unique thermal management components carrying unique fluids.

In yet another aspect of the present disclosure each of the plurality of dissimilar thermal fluid loops exchanges thermal energy with another of the plurality of dissimilar thermal fluid loops through a heat exchange device.

In yet another aspect of the present disclosure determining if thermal energy is needed further includes selectively operating a condenser. continuously operating the condenser, monitoring a condenser efficiency, and preventing condenser icing by exchanging thermal energy between dissimilar thermal fluid loops.

In yet another aspect of the present disclosure determining if thermal energy is needed further includes selectively operating a condenser further and utilizing an airflow management device to selectively prevent airflow to the condenser.

In yet another aspect of the present disclosure determining if thermal energy is needed further includes determining if a passenger compartment ambient temperature change has been requested.

In yet another aspect of the present disclosure determining if thermal energy is needed further includes determining an optimal operating temperature for a motor vehicle battery.

In yet another aspect of the present disclosure determining if thermal energy is needed further includes determining an optimal operating temperature for a motor vehicle drive unit, wherein the drive unit includes a motor.

In yet another aspect of the present disclosure determining if thermal energy is needed further includes determining an optimal amount regenerative braking energy.

In yet another aspect of the present disclosure determining if thermal energy is needed further includes determining an optimal amount of electrical energy to be drawn from an electrical grid when the motor vehicle is plugged into the electrical grid and charging.

In yet another aspect of the present disclosure selectively generating thermal energy further includes commanding at least one component in at least one of the dissimilar thermal fluid loops to generate a predetermined quantity of thermal energy, and selectively directing a flow of a thermal energy carrying fluid further comprises selectively rejecting thermal energy to an atmosphere surrounding the motor vehicle In yet another aspect of the present disclosure determining if a thermal energy deficit exists further includes determining if a quantity of stored thermal energy is below a predetermined threshold thermal energy storage value.

In yet another aspect of the present disclosure a method for continuously managing thermal energy in a motor vehicle includes initializing a continuous thermal energy management control loop within a controller disposed in the motor vehicle, calculating a quantity of stored energy in a plurality of dissimilar thermal fluid loops within a thermal management system equipped to the motor vehicle, each of the dissimilar thermal fluid loops having unique components and carrying a unique fluid, calculating a quantity of thermal energy waste in the thermal management system, determining if thermal energy is needed within a component of the thermal management system, selectively commanding at least one component in at least one of the dissimilar thermal fluid loops to generate a predetermined amount of thermal energy, selectively transporting thermal energy to the component of the thermal management system, determining a thermal storage capacity of the thermal management system, determining if a thermal energy deficit exists within the thermal management system, selectively directing a flow of a thermal energy carrying fluid to a thermal energy reservoir, and selectively directing a flow of the thermal energy carrying fluid to a heat exchange device in at least one of the dissimilar thermal loops, wherein the heat exchange device is exposed to an atmosphere surrounding the motor vehicle.

In yet another aspect of the present disclosure determining if thermal energy is needed further includes determining if a motor vehicle operator has requested a passenger compartment ambient temperature change.

In yet another aspect of the present disclosure determining if thermal energy is needed further includes determining an optimal operating temperature for a motor vehicle battery.

In yet another aspect of the present disclosure determining if thermal energy is needed further includes determining an optimal operating temperature for a motor vehicle drive unit, wherein the drive unit includes a motor.

In yet another aspect of the present disclosure determining if thermal energy is needed further includes determining an optimal amount of regenerative braking energy.

In yet another aspect of the present disclosure determining if thermal energy is needed further includes determining an optimal amount of electrical energy to be drawn from an electrical grid when the motor vehicle is plugged into the electrical grid and charging.

In yet another aspect of the present disclosure a method for continuously managing thermal energy in a motor vehicle further includes managing low quality thermal energy via the continuous thermal energy management control loop.

In yet another aspect of the present disclosure a method for continuously managing low quality thermal energy in a motor vehicle includes initializing a continuous thermal energy management control loop within a controller disposed in the motor vehicle, calculating a quantity of stored energy in a plurality of dissimilar thermal fluid loops within a thermal management system equipped to the motor vehicle, each of the dissimilar thermal fluid loops having unique components and carrying a unique fluid, calculating a quantity of thermal energy waste in the thermal management system, determining if a motor vehicle operator has requested a passenger compartment ambient temperature change, determining an optimal operating temperature for a motor vehicle battery, determining an optimal operating temperature for a motor vehicle drive unit, wherein the drive unit includes a motor, determining an optimal amount of regenerative braking energy, selectively commanding at least one component in at least one of the dissimilar thermal fluid loops to generate a predetermined amount of thermal energy, selectively transporting thermal energy to the component of the thermal management system, determining a thermal storage capacity of the thermal management system, determining if a thermal energy deficit exists within the thermal management system, selectively directing a flow of a thermal energy carrying fluid to a thermal energy reservoir, and selectively directing a flow of the thermal energy carrying fluid to a heat exchange device in at least one of the dissimilar thermal loops, wherein the heat exchange device is exposed to an atmosphere surrounding the motor vehicle.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
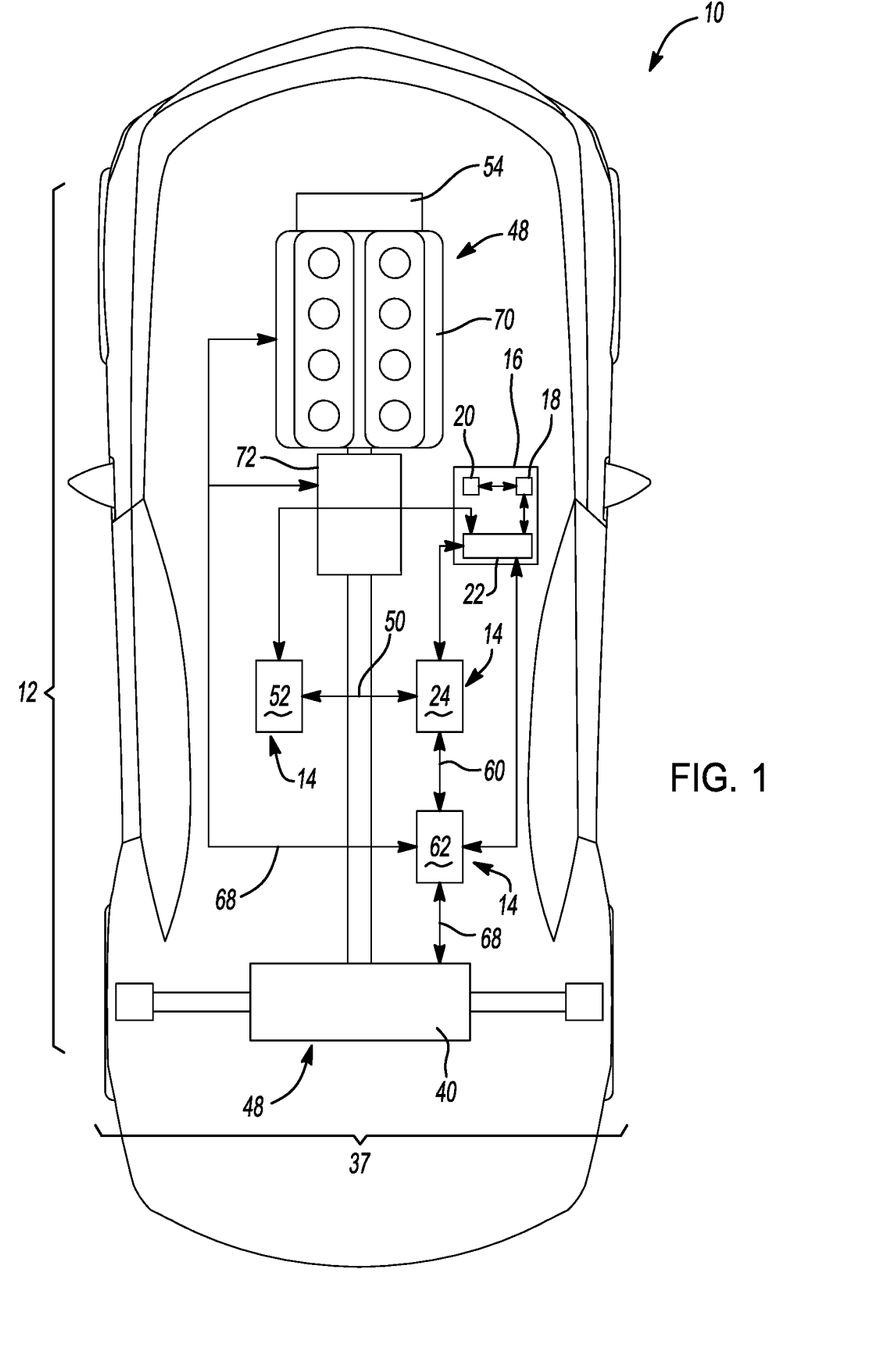
FIG. 1 is an environmental view of a thermal management system for a motor vehicle according to an aspect of the present disclosure.

Referring to FIG. 1, a motor vehicle is shown and indicated generally by reference number 10. While the motor vehicle 10 is depicted as a car, it should be understood that the motor vehicle 10 may be a car, a truck, an SUV, a van, a semi, a tractor, a bus, a go-kart, or any other such motor vehicle 10 without departing from the scope or intent of the present disclosure. The motor vehicle 10 is equipped with a thermal management system 12. In broad terms, the thermal management system 12 operates to selectively transport thermal energy from a heat source within the thermal management system 12 to a heat sink in the thermal management system 12, or from a heat source or a heat sink to a location within the thermal management system 12 where the thermal energy is needed. The thermal management system 12 includes a plurality of dissimilar thermal fluid loops 14 for various motor vehicle 10 sub-systems. Each of the dissimilar thermal fluid loops 14 has heat sources and heat sinks associated with one or more of the motor vehicle 10 sub-systems. However, some heat sinks are significantly more massive, and therefore, capable of storing more thermal energy, than other heat sinks. Accordingly, depending on the thermal energy storage capacities of various heat sinks within the thermal management system 12, thermal energy may be moved from one of the dissimilar thermal fluid loops 14 to another.

A controller 16 in electronic communication with a plurality of actuators, valves, and the like manages the operation of the thermal management system 12, including the plurality of dissimilar thermal fluid loops 14. The controller 16 is a non-generalized, electronic control device having a preprogrammed digital computer or processor 18, a memory or non-transitory computer readable medium 20 used to store data such as control logic, instructions, lookup tables, etc., and a plurality of input/output peripherals or ports 22. The processor 18 is configured to execute the control logic or instructions. The controller 16 may have additional processors or additional integrated circuits in communication with the processor 18 such as logic circuits for analyzing thermal management data. In some examples, the controller 16 may be better described as a plurality of controllers 16, each of which is designed to interface with and manage specific componentry within the motor vehicle 10, and each of the plurality of controllers 16 is in electronic communication with the others. However, while in some examples more than one controller 16 may be used, for ease of understanding, the following description will focus on a thermal management system 12 having only a single controller 16.

Figure 2:
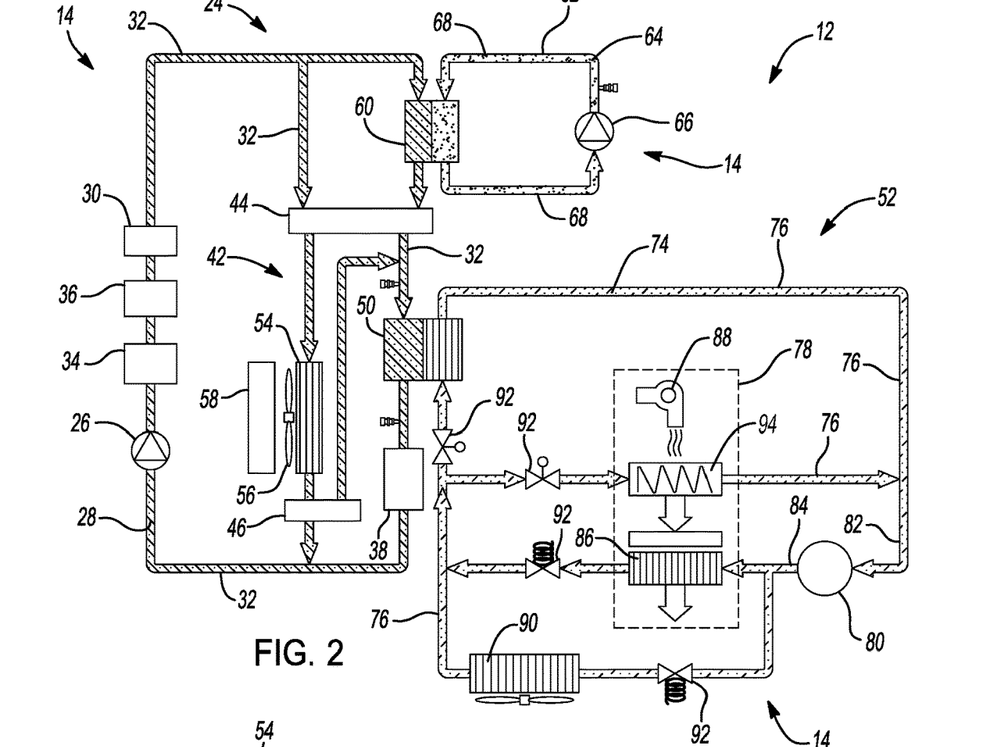
FIG. 2 is a system diagram depicting a thermal management system for a motor vehicle according to an aspect of the present disclosure.

Referring now to FIG. 2 and with continuing reference to FIG. 1, a first of the dissimilar thermal fluid loops 14 is a coolant loop 24. The coolant loop 24 includes a coolant pump 26 selectively pumping coolant 28 through a plurality of coolant conduits 32. The coolant conduits 32 are in fluid communication with a variety of coolant loop 24 components. In some aspects, the coolant loop 24 components includes an integrated power electronics (IPE) module 34. The IPE 34 is an electronic device having a variety of accessories usable by the motor vehicle operator. In some instances, the IPE 34 includes an AC/DC converter (not shown), a high voltage supply (not shown), a navigation system (not shown), a heated seat system (not shown), and other like devices and features. As the IRE 34 is operated, the electronics within the IRE 34 convert electrical energy into a variety of functions usable by the motor vehicle operator. In addition, thermal energy is generated as a byproduct of using electrical energy within the IRE 34 devices. The coolant 28 carries the thermal energy from the IRE 34 devices elsewhere in the coolant loop 24.

The coolant loop 24 further includes an onboard charging module (OBCM) 36 for a battery 38. The OBCM 36 is an electrical device designed to move energy into a secondary cell or rechargeable battery 38 by forcing an electrical current through the battery 38. In some examples, a single-phase 3.5 kW to 22 kW OBCM 36 is installed within the electrical system of the motor vehicle 10 and charges the motor vehicle 10 battery 38 from a power grid. In other examples, the battery 38 of the motor vehicle 10 can be used as an energy source, and therefore, the OBCM 36 can also direct electrical energy to the electrical grid, or to accessory or ancillary devices within the motor vehicle 10. In addition, the OBCM 36 can also direct electrical energy to devices, such as cellular phones, and the like that an operator of the motor vehicle 10 may power from electrical connections within the IRE 34 of the motor vehicle 10. Thus, in some instances, the OBCM 36 is a bi-directional battery 38 charging and discharging device. In many instances, the battery 38 is most efficiently charged when the battery 38 is heated to a predetermined target temperature. In one aspect, the predetermined target temperature is approximately 25° Celsius. However depending on the componentry and the thermal requirements of the thermal management system 12 components, the predetermined target temperature of the battery 38 may vary. In one example, to achieve the target temperature range, the battery 38 can be heated electrically via electrical energy supplied by the OBCM 36. In the example, the controller 16 effectively overdrives the OBCM 36 or drives the OBCM 36 in a calculatedly inefficient manner so as to convert a predetermined amount of electrical energy into thermal energy. In another example, the battery 38 itself is charged in a calculatedly inefficient manner. That is, the battery 38 is charged inefficiently so that a portion of the electrical energy being driven into the battery 38 by the OBCM 36 is converted into thermal energy which is then stored within the mass of the battery 38 while the battery 38 is being charged. In yet another example, thermal energy is directed to the battery 38 via coolant 28 carried by the coolant loop 24 from other heat sources within and external to the coolant loop 24. In some examples, the coolant loop 24 includes a coolant heater 30. The coolant heater 30 is an electrically-powered heater that adds thermal energy to the flow of coolant 28, thereby aiding in bringing the battery 38 up to an optimal charging temperature. In some examples, once the battery 38 has been electrically charged sufficiently, and charged sufficiently with thermal energy the temperature of the battery 38 is regulated by the OBCM 36.

In some aspects, a motor vehicle 10 braking system 37 includes a regeneration function. In motor vehicles 10 having regenerative braking systems, an electric motor 40 is used as an electric generator. Electricity generated by the electric motor 40 is fed back into the battery 38 by the OBCM 36. In some battery electric and hybrid vehicles, the energy is also stored in a bank of capacitors (not shown), or mechanically in a rotating flywheel (not shown). Under circumstances when the controller 16 and OBCM 36 determine that the battery 38 is fully charged, the electricity generated by the electric motor 40 can be converted into thermal energy and stored in the mass of the battery 38 or other thermal management system 12 components.

Figure 3:
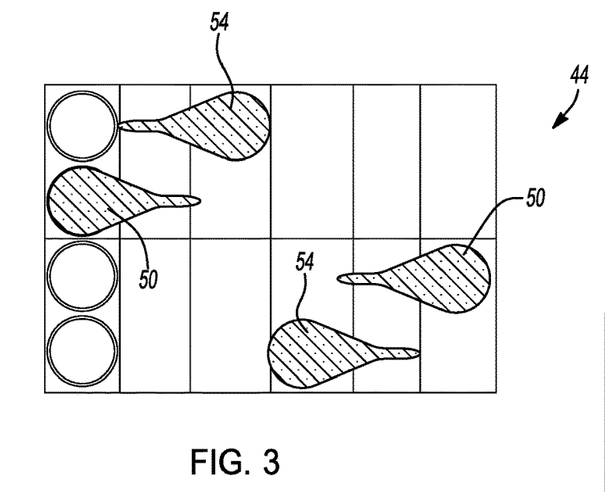
FIG. 3 is a first valve diagram depicting opening and closing states for a plurality of valves within a thermal management system for a motor vehicle according to an aspect of the present disclosure.
Figure 4:
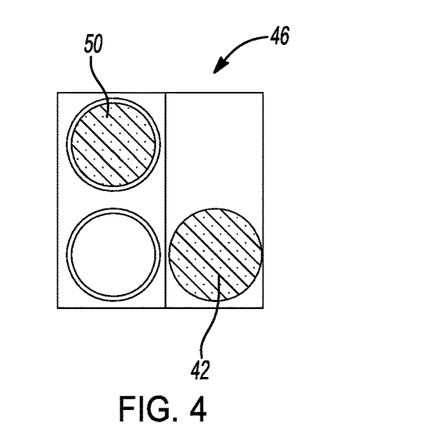
FIG. 4 is a second valve diagram depicting opening and closing states for a valve within a thermal management system for a motor vehicle according to an aspect of the present disclosure.

Referring now to FIGS. 3 and 4, and with continuing reference to FIGS. 1 and 2, to maintain optimal battery 38 temperature, in some examples, the coolant loop 24 further includes a battery bypass 42. In general terms, the battery bypass 42 is operable to selectively provide coolant 28 flow through the battery 38 or to bypass the battery 38 under a predetermined set of conditions. For example, the battery bypass 42 is set in a closed position when temperature of the battery 38 is below the optimal battery 38 temperature. In the example, coolant 28 flows through the battery 38 and imparts thermal energy to the battery 38 from the OBCM 36, the coolant heater 30 and other thermal management system 12 components. In a second example, the battery bypass 42 is set in an open position when the battery temperature is above the optimal battery 38 temperature. In the second example, coolant 28 flow is directed away from the battery 38. The controller 16 manages the flow of coolant 28 through the battery bypass 42 by way of at least a first bypass valve 44 and a second bypass valve 46. The first bypass valve 44 operates to selectively direct the flow of coolant 28 past a second of the dissimilar thermal fluid loops 14, namely around a drive unit 48 disposed in a drive unit oil loop 62. The drive unit 48 provides torque to move the motor vehicle 10, and will be described in more detail below. The second bypass valve 46 operates to selectively direct the flow of coolant 28 around a third of the dissimilar thermal fluid loops 14, namely around a chiller 50 of a refrigerant loop 52. Depending on the requirements of the thermal management system 12, the first and second bypass valves 44, 46 may be variable force solenoids (VFS) or valves, variable bleed solenoids (VBS) or valves, or binary or mode control solenoids or valves.

In the example of FIG. 3, the first bypass valve 44 is of the VFS or VBS type. Thus, the first bypass valve 44 is configured to be varied along a continuous spectrum between a fully closed state and opened state. In the fully closed state, the first bypass valve 44 prevents all coolant 28 flow incident upon an inlet of the first bypass valve 44 from flowing through the first bypass valve 44 to an outlet of the first bypass valve 44. By contrast, in the fully opened state, the first bypass valve 44 will provide all coolant 28 flow incident upon the inlet of the first bypass valve 44 to the outlet of the first bypass valve 44. The first bypass valve 44 should be understood to vary the valve opening in accordance with the coolant 28 flow demands of the thermal management system 12.

In FIG. 3, the upper half of the valve diagram depicts a situation in which the drive unit 48 is receiving thermal energy from the coolant 28 via a heat exchange device, such as a transmission oil cooler (TOC) 60. The upper half of the valve diagram shows that the first bypass valve 44 is providing a variable amount of flow through the radiator 54 and the chiller 50 while also providing coolant 28 to the TOC 60. In the bottom half of the valve diagram in FIG. 3, the valve diagram shows a situation in which the first bypass valve 44 is shunting coolant 28 away from the TOC 60, thereby bypassing heat exchange with the drive unit oil loop 62 entirely. However, the first bypass valve 44 still provides variable flow through the radiator 54 and the chiller 50.

In the example of FIG. 4, the second bypass valve 46 is of the binary or mode control variety. That is, the second bypass valve 46 is a binary valve having only fully open and fully closed states. In the fully closed state, the second bypass valve 46 prevents all coolant 28 flow incident upon an inlet of the second bypass valve 46 from flowing through the second bypass valve 46 of an outlet of the second bypass valve 46. By contrast, in the fully opened state, the second bypass valve 46 will provide all coolant 28 flow incident upon the inlet of the second bypass valve 46 to the outlet of the second bypass valve 46. The second bypass valve 46 should be understood to operate in open or closed states in accordance with the coolant 28 flow demands of the thermal management system 12. In the upper half of the valve diagram of FIG. 4, the second bypass valve 46 of FIG. 4 is depicted in a closed state in which coolant 28 flow is provided to the chiller 50. In the bottom half of the valve diagram of FIG. 4, in the open state, the second bypass valve 46 directs coolant 28 to bypass the chiller 50 and the battery 38 as well, thereby forming part of the battery bypass 42. Thus, when the second bypass valve 46 is open, coolant 28 flows from the second bypass valve 46 directly into the coolant conduits 32 leading to the coolant pump 26.

In some examples, the first and second bypass valves 44, 46 selectively direct the flow of coolant 28 through a radiator 54. The radiator 54 exchanges thermal energy between the coolant 28 and the atmosphere external to the motor vehicle 10. Thus, when the radiator 54 is used, thermal energy is rejected from the motor vehicle 10. In some examples, the radiator 54 operates in conjunction with a fan 56 and an airflow management device, such as a shutter mechanism 58 operable to precisely regulate the temperature of the radiator 54, and therefore, the coolant 28 passing through the radiator 54. In some aspects, the shutter mechanism 58 is a series of vanes or flaps disposed in an orifice (not shown) on an exterior surface of the motor vehicle 10, such as a front, side, underside or top-side-facing air intake (not shown), or an intake disposed within a foglight housing (not shown), or the like. The vanes or flaps of the shutter mechanism 58 are moved through a range of motion that provides at least an open position and a closed position. In several aspects, the controller 16 can alter the position of the shutter mechanism 58 electromechanically by way of solenoids, motors, actuators, and the like, hydraulically, by aerodynamic forces, or any combination of the above. In the open position, airflow incident upon the shutter mechanism 58 is allowed to pass through the shutter mechanism 58 and towards the radiator 54 and/or the fan 56. In the closed position, airflow incident upon the shutter mechanism 58 is prevented from passing through to the radiator 54 and/or the fan 56. While shutter mechanism 58 has been described herein as having open and closed positions, it should be understood that the shutter mechanism 58 may be manipulated into any position between fully open and fully closed as well. Thus, the controller 16 can manipulated the shutter mechanism 58 precisely to provide and modulate airflow to the radiator 54 when such airflow is desirable, and to prevent such airflow when no airflow is needed. In some examples, the controller 16 commands the shutter mechanism 58 to remain closed under a wide range of drive cycle conditions, thereby minimizing thermal energy rejection to atmosphere via the radiator 54.

In further examples, the first and second bypass valves 44, 46 variably direct the flow of coolant 28 through both the battery 38 and the radiator 54, as shown in FIG. 3, thereby providing the coolant loop 24 with the ability to precisely thermoregulate the battery 38 and other components within the coolant loop 24.

The first bypass valve 44 selectively directs coolant 28 flow through the battery 38 and/or through a transmission oil cooler (TOC) 60 disposed in the second of the dissimilar thermal fluid loops 14, namely, a drive unit oil loop 62. The TOC 60 is a heat exchange device providing a means of thermal energy transfer between the coolant loop 24 and the drive unit oil loop 62. The TOC 60 includes at least two passageways physically separated from one another. That is, on a first side of the TOC 60, a coolant 28 passageway (not shown) carries coolant 28 through the TOC 60 as a part of the coolant loop 24. On a second side of the TOC 60, an oil passageway (not shown) carries oil 64 through the TOC 60 as a part of the drive unit oil loop 62. However, it should be understood that despite the fact that the TOC 60 includes both a portion of the coolant loop 24 and the oil loop 62, there is no fluid interface between coolant 28 and oil 64 within the TOC 60, and thus the coolant 28 and oil 64 are prevented from mixing.

An oil pump 66 pumps the lubricating oil 64 through a plurality of oil conduits 68 in fluid communication with a drive unit 48. The drive unit 48 is a plurality of mechanical devices that convert chemical or electrical energy into torque to motivate the motor vehicle 10. In several aspects, the mechanical devices include an engine 70 and a transmission 72. The engine 70 may be an internal combustion engine (ICE), an electric motor 40, and/or any other type of prime mover without departing from the scope or intent of the present disclosure. In some aspects, the engine 70 operates in conjunction with, or may be replaced entirely by at least one electric motor 40. The engine 70 and/or electric motor 40 provides torque that moves the motor vehicle 10 via a transmission 72. The transmission 72 may be a manual, automatic, multi-clutch, or continuously variable transmission, or any other type of electronically, pneumatically, and/or hydraulically-controlled automotive transmission 72 without departing from the scope or intent of the present disclosure. The transmission 72 is mechanically and/or fluidly coupled to the engine 70. The drive unit oil loop 62 circulates the oil 64 throughout the transmission 72, thereby keeping the internal components of the transmission 72 lubricated. In some aspects, the transmission 72 and the engine 70 share a supply of oil 64 via the oil loop 62. Moreover, in some examples, the circulating oil 64 is used to heat or warm the transmission 72 during engine 70 startup or cool the transmission 72 as necessary during heavy use. The drive unit 48 has a predetermined optimal operating temperature at which the lubricating oil 64 has desirable viscosity and lubrication characteristics. In several aspects, the predetermined optimal operating temperature is approximately 70° Celsius. However, depending on the application and the components of the drive unit 48 and in the drive unit oil loop 62, the optimal operating temperature may vary substantially. For example, in drive units 48 having an internal combustion engine 70, the optimal oil 64 temperature circulating through the engine 70 between about 85° Celsius and about 120° Celsius. In another example, in drive units 48 having an automatic transmission 72, the optimal temperature of the oil 64 circulating through the automatic transmission 72 may be between about 20° Celsius and about 110° Celsius. In still another example, in drive units 48 having an automatic transmission 72 coupled to a torque converter (not shown), the temperature of oil 64 circulating through the torque converter may be between about 90° and about 180° Celsius.

Referring once more to FIG. 4 and with continuing reference to FIGS. 1-3, the second bypass valve 46 selectively directs coolant 28 flow through the battery 38 and/or through a chiller 50 disposed in the third of the dissimilar thermal fluid loops 14, in particular, a refrigerant loop 52. The chiller 50 is a heat exchange device providing a means of thermal energy transfer between the coolant loop 24 and the refrigerant loop 52. However, like the TOC 60, the chiller 50 includes at least two passageways physically separated from one another. That is, on a first side of the chiller 50, a coolant 28 passageway (not shown) carries coolant 28 through the chiller 50 as a part of the coolant loop 24. On a second side of the chiller 50, a refrigerant passageway (not shown) carries a refrigerant 74 through the chiller 50 as a part of the refrigerant loop 52. However, it should be understood that despite the fact that the chiller 50 includes both a portion of the coolant loop 24 and the refrigerant loop 52, there is no fluid interface between coolant 28 and refrigerant 74 within the chiller 50, and thus the coolant 28 and refrigerant 74 are prevented from mixing.

The refrigerant loop 52 includes a plurality of refrigerant conduits 76 fluidly connecting a plurality of devices operable to thermally regulate a passenger compartment (not specifically shown) of the motor vehicle 10. The refrigerant loop 52 also carries thermal energy to and from the coolant loop 24 via the chiller 50. The refrigerant loop 52 includes a variety of operator comfort systems such as a heating, ventilation, and air conditioning (HVAC) system 78. Fundamentally, the refrigerant loop 52 has a heating function and a cooling function. Within the refrigerant loop 52, the HVAC system 78 provides heated and/or cooled air to a passenger compartment of the motor vehicle 10. Stated another way, the HVAC system 78 transports thermal energy from a cooler location to a warmer location within the refrigerant loop 52. In several aspects, the HVAC system 78 functions as a heat pump. That is, the HVAC system 78 is an air conditioner in which both heating and cooling functions are possible.

In one example, the operator of the motor vehicle 10 determines a desired passenger compartment air temperature and selects a heating cycle for the HVAC system 78. The HVAC system 78 includes a compressor 80. The refrigerant 74 enters the compressor 80 via a refrigerant conduit 76 known as a suction line 82. The compressor 80 compresses gaseous refrigerant 74, thereby increasing the temperature and pressure of the refrigerant 74. The now high-pressure, high-temperature refrigerant 74 then leaves the compressor 80 via a refrigerant conduit 76 known as a discharge line 84 and flows into a cabin condenser 86. In some aspects, the cabin condenser 86 is a heat exchange device having a plurality of condenser coils through which the refrigerant 74 flows. The coils are in contact with the passenger compartment atmosphere. An HVAC blower or fan 88 blows air over the cabin condenser 86, thereby releasing thermal energy from the condenser 86 into the passenger compartment atmosphere. In some aspects, the refrigerant loop 52 includes a second or exterior condenser 90. The exterior condenser 90 is in contact with the atmosphere external to the motor vehicle 10 and when engaged, releases thermal energy from the refrigerant 74 from the motor vehicle 10 to the atmosphere.

The HVAC system 78 further includes a plurality of expansion valves 92. Depending on the HVAC system 78 design parameters, the expansion valves 92 may be mechanical thermostatic expansion valves (TXV) (not specifically shown) and/or electronic expansion valves (EXV) (not specifically shown). Control over the rate of refrigerant 74 expansion can be more directly and precisely controlled with EXVs than with TXVs, however in some cases it is desirable to use TXVs for reasons of cost, simplicity, and so forth. Condensed, pressurized, and still somewhat warm refrigerant 74 received from the cabin condenser 86 and/or exterior condenser 90 is routed through an expansion valve 92. As the refrigerant 74 is de-pressurized by the expansion valve 92, the refrigerant 74 cools. The refrigerant 74 then passes through an evaporator 94. The evaporator 94 is a heat exchange device in which a series of refrigerator coils (not shown) carry a flow of cooled refrigerant 74. The refrigerator coils exchange thermal energy with the passenger compartment atmosphere. The HVAC blower or fan 88 blows air over the cabin evaporator 94 thereby cooling the passenger compartment of the motor vehicle 10. The refrigerant 74, having passed through the evaporator 94 is then directed back through the compressor 80. Refrigerant 74 is also selectively passed through an expansion valve 92 to the chiller 50 where thermal energy is either obtained from or released to the coolant loop 24, depending on the relative temperatures of the coolant 28 and the refrigerant 74, and the thermal requirements of the battery 38 and other thermal management system 12 componentry.

In one example, the HVAC system 78 can be operated intermittently or continuously by occupants in the passenger compartment, or by the controller 16 depending on optimal heating and/or cooling requirements of the passenger compartment, or optimal heating and/or cooling requirements of other thermal management system 12 components. In one example, the HVAC system 78 operates continuously as a heat pump. As previously discussed, while operating as a heat pump, the HVAC system 78 directs refrigerant 74 through the cabin condenser 86, thereby rejecting the thermal energy in the refrigerant 74 to the passenger compartment and cooling the refrigerant 74. However, because the refrigerant loop 52 exchanges thermal energy with the coolant loop 24 in the chiller 50, a temperature of the refrigerant 74 in the refrigerant loop 52 remains substantially above the freezing point of water. That is, the refrigerant 74 continuously exchanges thermal energy with the coolant 28, and with oil 64 in the oil loop 62 via the coolant 28 in the coolant loop 24. Therefore, while refrigerant 74 passing through the cabin condenser 86 and the exterior condenser 90 rejects thermal energy, and is thereby cooled, thermal energy is also obtained as the refrigerant 74 passes through the chiller 50. Thus, because the temperature of the refrigerant 74 remains substantially above the freezing point of water, the cabin condenser 86 remains substantially free of ice accumulation. Similarly, in a second example, the controller 16 directs refrigerant 74 through the exterior condenser 90 where the refrigerant 74 is cooled by rejecting thermal energy to the atmosphere, but because the refrigerant 74 also flows through the chiller 50, a temperature of the refrigerant 74 remains substantially above the freezing point of water. Therefore, in both the first and second examples, ice is prevented from forming on both the cabin and exterior condensers 86, 90 even if one, the other, or both the cabin and exterior condensers 86, 90 are used continuously. Moreover, even if ice does begin to accumulate on the cabin and exterior condensers 86, 90, the controller 16 directs thermal energy from one of the thermal energy reservoirs in the oil loop 62 or the coolant loop 24 to the chiller 50, and using the expansion valves 92, through the interior and/or exterior condensers 86, 90, thereby melting any accumulation of ice as needed.

Figure 5:
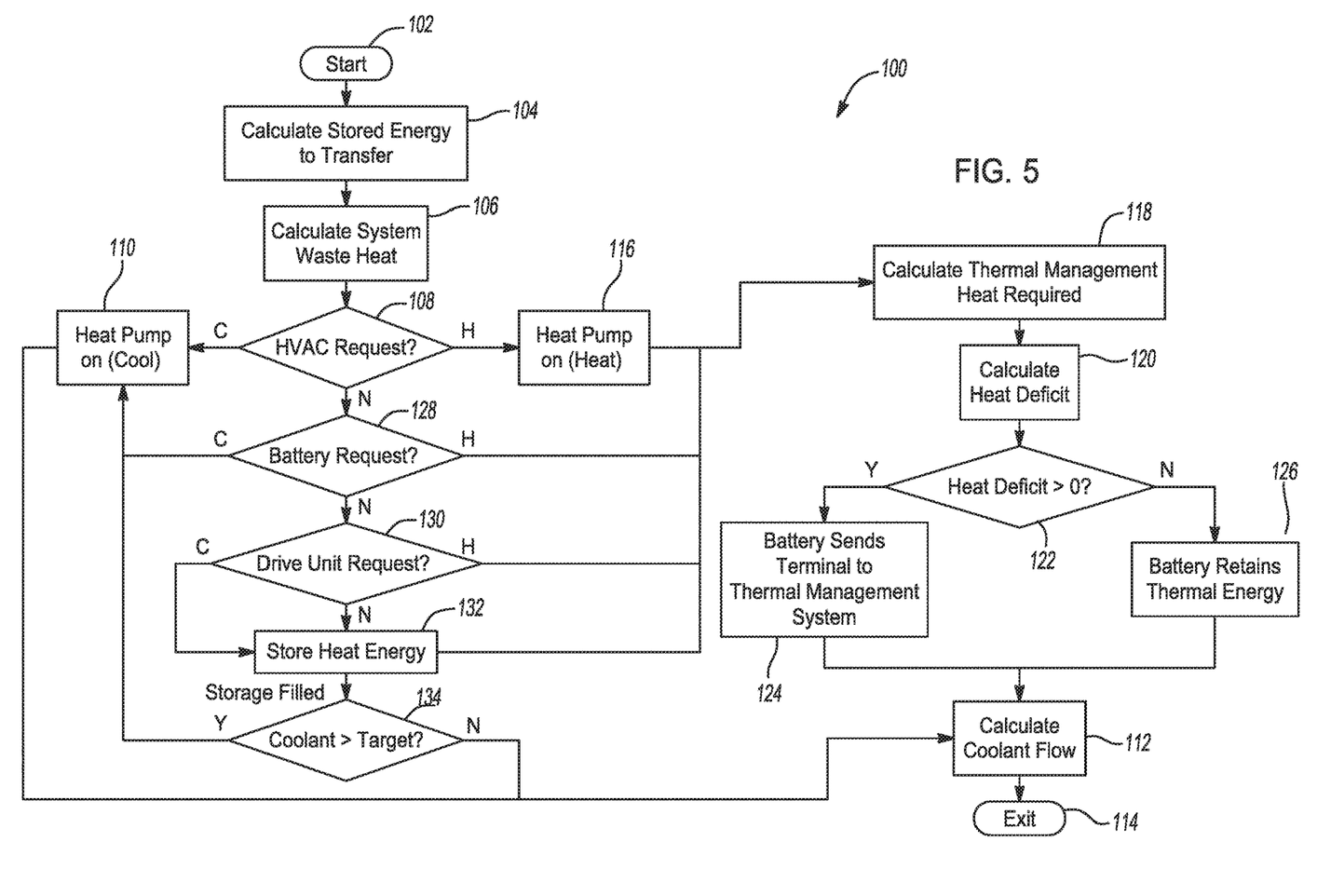
FIG. 5 is a flow diagram depicting a method of controlling a thermal management system for a motor vehicle according to an aspect of the present disclosure.

Turning now to FIG. 5, a thermal management method 100 for controlling the functionality of the thermal management system 12 is shown in flowchart form. In general terms, the controller 16 manages the functions of the coolant loop 24, the drive unit oil loop 62 and the refrigerant loop 52 via the TOC 60 and the chiller 50 to transfer thermal energy to devices within the motor vehicle 10 where the thermal energy is needed. Additionally, the controller 16 directs the storage of thermal energy in various components of the dissimilar thermal fluid loops 14 depending on the needs of the thermal management system 12.

The thermal management method 100 begins at block 102 where a continuous thermal management system 12 control loop is initiated. The method proceeds to block 104 where the controller 16 calculates a stored energy in the thermal management system 12. In general terms, the stored energy is a sum of energy stored in the battery 38, energy stored in the drive unit 48, energy stored in other componentry of the motor vehicle 10 (e.g. a sum of the energy stored in the refrigerant loop 52, IRE 34, and the like). In more specific terms, the energy stored in the battery 38 is a measure of the heat capacity of the battery 38 multiplied by the temperature of the battery 38 subtracted from the temperature of the coolant 28. The drive unit 48 energy is the heat capacity of the drive unit 48 multiplied by the temperature of the oil 64 subtracted from the temperature of the coolant 28. The energy stored in other componentry of the motor vehicle 10 is a function of the sum of the heat capacities of the various components multiplied by the fluid temperature in the relevant one of the dissimilar thermal fluid loops 14 subtracted from the temperature of the coolant 28.

The method 100 then proceeds to block 106 where the controller 16 calculates a system waste heat. The system waste heat is a sum of excess thermal energy in each component of the thermal management system 12. The method then proceeds to block 108 where the controller 16 determines whether an HVAC system 78 request has been made. The HVAC system 78 request made at block 108 can be in the form of a "heat" request or a "cool" request. When the HVAC system 78 request is a "cool" request, the thermal management system 12 operates as a heat pump to cool the passenger compartment at block 110. At block 112, the controller 16 calculates a coolant 28 flow as a function of the quantity of thermal energy in the coolant 28, the battery 38, the HVAC system 78, and electronic heating apparatuses, such as wall chargers for the motor vehicle 10 and the like operated by the OBCM 36. At block 114, the thermal management method 100 exits and returns to block 102 where the continuous thermal management loop begins once more.

When the HVAC system 78 request is a "heat" request, the method 100 proceeds to block 116 where the controller 16 operates the thermal management system 12 as a heat pump to heat the passenger compartment. At block 118, the controller 16 calculates a thermal management system 12 heat requirement. The thermal management system heat 12 heat requirement is a sum of the heat pump heat required, the battery 38 heat required, and the drive unit 48 heat required. At block 120, the controller 16 calculates a heat deficit based on the thermal management system 12 heat required subtracted from the sum of recoverable stored heat energy and system waste heat. At block 122, the controller 16 determines whether the heat deficit from block 120 is greater than zero. At block 124 if the heat deficit is greater than zero, the battery 38 operates to provide thermal energy to the thermal management system 12. That is, the battery 38 releases thermal energy stored in the mass of the battery 38 into the coolant 28, thereby moving thermal energy from a source (the battery 38) to the appropriate sink (in this case, the HVAC system 78). In another example, the controller 16 can command the battery 38 to provide electrical energy to a thermal energy generator, such as the cabin condenser 86. In still another example, the controller 16 commands all high-voltage devices in the thermal management system 12, such as the coolant heater 30, IRE 34, OBCM 36, and battery 38, to operate inefficiently, thereby producing thermal energy as a byproduct of electrical energy usage and provide the thermal energy to the appropriate thermal energy sink via the coolant 28. In yet another example, the controller 16 commands OBCM 36 to convert electrical energy from the regenerative braking system 37 to thermal energy. In some aspects, to convert electrical energy from the regenerative braking system 37 into thermal energy, the electric motor 40 is operated inefficiently. That is, in some circumstances, the electric motor 40 provides drag against a torque provided by the engine 70, thereby causing both the engine 70 and the electric motor 40 to generate thermal energy as a byproduct of operation. The thermal energy is then collected by circulating coolant 28 and distributed to locations where the thermal energy is needed. At block 126, if the heat deficit is not greater than zero, the battery 38 remains a thermal and electrical energy reservoir and the controller 16 does not command the battery 38 to release energy to the thermal management system 12 for heating purposes. After either block 124 or block 126, the method 100 proceeds to block 112, then to block 114, and subsequently to block 102 where the continuous thermal management loop begins once more.

Referring once more to block 108, the HVAC system 78 does not always make a request. Therefore, when no such request is made, the thermal management method 100 proceeds to block 128 where the controller 16 determines if a battery 38 request has been made. Like the HVAC system 78 requests, the battery request can be in the form of a "heat"

or a "cool" or no request at all. In the case of a "cool" request, the thermal management method 100 proceeds to block 110 where the controller 16 operates the thermal management system 12 as a heat pump to cool the battery 38. That is, the controller 16 operates the thermal management system 12 to evacuate thermal energy from the battery 38 via the coolant 28, thereby moving the thermal energy to other locations within the thermal management system 12 where the thermal energy is needed. At block 112, the controller 16 calculates a coolant 28 flow as a function of the quantity of thermal energy in the coolant 28, the battery 38, the HVAC system 78, and electronic heating apparatuses, such as wall chargers for the motor vehicle 10 and the like operated by the OBCM 36. At block 114, the thermal management method 100 exits and returns to block 102 where the continuous thermal management loop begins once more.

When the battery 38 request is a "heat" request, as with the HVAC system 78 heat request, the thermal management method 100 proceeds to block 116 where the controller 16 operates the thermal management system 12 as a heat pump to collect thermal energy from thermal energy sources and reservoirs within the thermal management system 12 and transfer the thermal energy to the battery 38. The thermal management method 100 then proceeds to block 118, 120, 122, and 124 or 126, then 112 and 114 as in example of the HVAC system 78 heat request above. Referring once more to block 128, the battery 38 does not always make a request. Therefore, when no request is made, the thermal management method 100 proceeds to block 130 where the controller 16 determines if a drive unit 48 request has been made.

As with the HVAC system 78 and battery 38 above, the drive unit 48 request can be in the form of a "heat" or a "cool" request, or no request at all. When the controller 16 determines that a "cool" request has been made, the method 100 proceeds to block 132 where the controller 16 commands the thermal management system 12 to store thermal energy in any of a variety of thermal energy reservoirs in the thermal management system 12. The thermal energy reservoirs can be any of the components of the coolant loop 24, the drive unit oil loop 62, or the refrigerant loop 52. In some aspects, the more mass that a thermal energy reservoir has, the more thermal energy the reservoir can store. However, the composition, density, surface area, insulation, and other physical characteristics of the thermal energy reservoirs are also pertinent factors in thermal energy storage capacity of a given reservoir. Moreover, at block 132, the controller 16 calculates the quantity of the thermal storage capacity of the thermal management system 12 that has been used. The controller 16 uses information regarding the quantity of thermal storage capacity used in the thermal management system 12 at block 120 to assist in calculating the heat deficit of the thermal management system 12. In addition, at block 132, the controller 16 calculates a percentage of overall thermal management system 12 thermal energy storage capacity that has been filled with thermal energy.

When the controller 16 determines that a drive unit 48 "heat" request has been made, the method 100 proceeds to block 118 where the thermal management system 12 operates as a heat pump to collect thermal energy from thermal energy sources and reservoirs within the thermal management system 12 and transfer the thermal energy to the drive unit 48. The thermal management method 100 then proceeds to blocks 118, 120, 122, and 124 or 126, then 112, 114, and subsequently back to block 102 as in example of the HVAC system 78 and battery 38 heat requests above. Referring once more to block 130, the drive unit 48 does not always make a request. Therefore, when no request is made, the thermal management method 100 proceeds to block 132 where the controller 16 commands the thermal management system 12 to store thermal energy in any of a variety of thermal energy reservoirs in the thermal management system 12. The thermal energy reservoirs can be any of the components of the coolant loop 24, the drive unit oil loop 62, or the refrigerant loop 52. In some aspects, the more mass that a thermal energy reservoir has, the more thermal energy the reservoir can store. However, the composition, density, surface area, insulation, and other physical characteristics of the thermal energy reservoirs are also pertinent factors in thermal energy storage capacity of a given reservoir. Moreover, at block 132, the controller 16 calculates the quantity of the thermal storage capacity of the thermal management system 12 that has been used. The controller 16 uses information regarding the quantity of thermal storage capacity used in the thermal management system 12 at block 120 to assist in calculating the heat deficit of the thermal management system 12. In addition, at block 132, the controller 16 calculates a percentage of overall thermal management system 12 thermal energy storage capacity that has been filled with thermal energy.

At block 134, the controller 16 determines whether the temperature of the coolant 28 is higher than a predetermined target temperature. The predetermined target temperature is selected as an indication of when the full storage capacity of the thermal management system 12 has been achieved. That is, when the thermal management system 12 is fully filled with thermal energy, the temperature of the coolant 28 will rise for each additional quantum of energy (thermal or otherwise) added to the thermal management system 12. If the thermal management system 12 is full, the method 100 proceeds to block 110 where the thermal management system 12 operates as heat pump to cool the components of the thermal management system 12. In several aspects, to cool the thermal management system 12, the controller 16 commands the thermal management system 12 to reject excess thermal energy to the passenger compartment or to the atmosphere surrounding the motor vehicle 10 via the radiator 54 and/or the exterior condenser 90 of the HVAC system 78, or other such heat exchangers. The thermal management method 100 then proceeds to blocks 112, 114, and subsequently to block 102 where the method 100 operates continuously. However, if the controller 16 determines that the thermal management system 12 is not full, the method 100 proceeds to block 112 where the controller 16 calculates a coolant 28 flow as a function of the quantity of thermal energy in the coolant 28, the battery 38, the HVAC system 78, and electronic heating apparatuses, such as wall chargers for the motor vehicle 10 and the like operated by the OBCM 36. At block 114, the thermal management method 100 exits and returns to block 102 where the continuous thermal management loop begins once more.

While the above described thermal management method 100 is described as having a series-wise set of calculations based on the HVAC system 78 request at block 108, the battery 38 request at block 128, and the drive unit 48 request at block 130 it should be understood that each of the calculations carried out in blocks 108, 128, and 130 may be carried out in series, in parallel, or out of the order given in FIG. 5 without departing from the scope or intent of the present disclosure.

A motor vehicle thermal management system 12 and method 100 for controlling the thermal management system 12 of a motor vehicle 10 of the present disclosure offers several advantages. These include low cost of production, simplified componentry, reduced size and cost of componentry, simplified computer and fluid control architecture, adaptability, increased fuel economy (or MPGe), improved safety, improved emissions, and applicability to a wide variety of motor vehicles 10 and drivetrain types. Additionally, the system and method of the present disclosure improve the reliability and robustness of thermal management for motor vehicle 10 systems by providing increased thermal energy storage redundancy and resiliency in preexisting motor vehicle 10 components.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A method for continuously managing thermal energy in a motor vehicle comprises:
   initializing a continuous thermal energy management control loop within a controller disposed in the motor vehicle;
   calculating a quantity of stored energy in a thermal management system equipped to the motor vehicle including calculating a quantity of thermal energy stored in each of a plurality of dissimilar thermal fluid loops within the thermal management system;
   calculating a quantity of thermal energy waste in the thermal management system, wherein the quantity of thermal energy waste is a sum of excess thermal energy in each component of the thermal management system;
   determining if thermal energy is needed within a component of the thermal management system;
   selectively generating thermal energy;
   selectively transporting thermal energy to the component of the thermal management system;
   determining a thermal storage capacity of the thermal management system;
   determining if a thermal energy deficit exists within the thermal management system, wherein the thermal energy deficit is a quantity of thermal energy required by the thermal management system subtracted from the sum of the stored energy and the thermal energy waste;
   selectively directing a flow of a thermal energy carrying liquid to a thermal energy reservoir, and wherein each of the plurality of dissimilar thermal fluid loops exchanges thermal energy with another of the plurality of dissimilar thermal fluid loops through a heat exchange device, wherein the plurality of dissimilar thermal fluid loops comprises at least: a refrigerant loop, a coolant loop, and a drive unit oil loop, and wherein the refrigerant loop exchanges thermal energy with the coolant loop via a chiller, and wherein the drive unit oil loop exchanges thermal energy with the coolant loop via a transmission oil cooler; and
   selectively and precisely regulating a temperature of coolant passing through a radiator of the coolant loop by utilizing an airflow management device to selectively and variably prevent a flow of ambient air through the radiator, wherein calculating a quantity of stored energy in a thermal management system further comprises:
   calculating a quantity of thermal energy stored in a battery as a measure of a heat capacity of the battery multiplied by a temperature of the battery, subtracted from a temperature of coolant in the coolant loop; and
   calculating a quantity of thermal energy stored in the drive unit as a measure of a heat capacity of the drive unit multiplied by a temperature of oil in the drive unit oil loop, subtracted from the temperature of the coolant in the coolant loop, and wherein determining if thermal energy is needed further comprises: determining an optimal amount of regenerative braking energy such that thermal energy generated by the regenerative braking system is transferred by coolant in the coolant loop from the regenerative braking system to other thermal fluid loops and other components of the thermal management system.

2. The method of claim 1 wherein the chiller includes at least two passageways physically separated from one another, wherein a first passageway through the chiller carries coolant of the coolant loop, and a second passageway carries refrigerant as part of the refrigerant loop, and wherein the transmission oil cooler includes at least two passageways physically separated from one another, wherein a first passageway through the transmission oil cooler carries coolant of the coolant loop, and a second passageway through the transmission oil cooler carries oil of the drive unit oil loop.

3. The method of claim 1 wherein each of the plurality of dissimilar thermal fluid loops comprises different thermal management components carrying different fluids.

4. The method of claim 1 further comprising selectively operating a condenser, wherein selectively operating a condenser further comprises continuously operating the condenser, monitoring a condenser efficiency, and preventing condenser icing by exchanging thermal energy between dissimilar thermal fluid loops.

5. The method of claim 1 wherein determining if thermal energy is needed further comprises determining if a passenger compartment ambient temperature change has been requested.

6. The method of claim 1 wherein determining if thermal energy is needed further comprises determining an optimal operating temperature for a motor vehicle battery.

7. The method of claim 1 wherein determining if thermal energy is needed further comprises determining an optimal operating temperature for a motor vehicle drive unit, wherein the drive unit includes a motor.

8. The method of claim 1 wherein determining if thermal energy is needed further comprises determining an optimal amount of electrical energy to be drawn from an electrical grid when the motor vehicle is plugged into the electrical grid and charging.

9. The method of claim 1 wherein selectively generating thermal energy further comprises commanding at least one component in at least one of the dissimilar thermal fluid loops to generate a predetermined quantity of thermal energy; and wherein selectively directing a flow of a thermal energy carrying fluid further comprises selectively rejecting thermal energy to an atmosphere surrounding the motor vehicle.

10. The method of claim 1 wherein determining if a thermal energy deficit exists further comprises determining if a quantity of stored thermal energy is below a predetermined threshold thermal energy storage value.

11. A method for continuously managing thermal energy in a motor vehicle comprises:
   initializing a continuous thermal energy management control loop within a controller disposed in the motor vehicle;
   calculating a quantity of stored energy in a plurality of dissimilar thermal fluid loops within a thermal management system equipped to the motor vehicle including calculating a quantity of thermal energy stored in each of a plurality of dissimilar thermal fluid loops within the thermal management system, each of the dissimilar thermal fluid loops having different components and carrying a different fluid;

calculating a quantity of thermal energy waste in the thermal management system, wherein the quantity of thermal energy waste is a sum of excess thermal energy in each component of the thermal management system;

determining if thermal energy is needed within a component of the thermal management system;

selectively commanding at least one component in at least one of the dissimilar thermal fluid loops to generate a predetermined amount of thermal energy;

selectively transporting thermal energy to the component of the thermal management system;

determining a thermal storage capacity of the thermal management system;

determining if a thermal energy deficit exists within the thermal management system, wherein the thermal energy deficit is a quantity of thermal energy required by the thermal management system subtracted from the sum of the stored energy and the thermal energy waste;

selectively directing a flow of a thermal energy carrying fluid to a thermal energy reservoir;

selectively directing a flow of the thermal energy carrying fluid to a heat exchange device in at least one of the dissimilar thermal loops, wherein the heat exchange device is exposed to an atmosphere surrounding the motor vehicle, and wherein each of the plurality of dissimilar thermal fluid loops exchanges thermal energy with another of the plurality of dissimilar thermal fluid loops through a heat exchange device, wherein the plurality of dissimilar thermal fluid loops comprises at least: a refrigerant loop, a coolant loop, and a drive unit oil loop, and wherein the refrigerant loop exchanges thermal energy with the coolant loop via a chiller, and wherein the drive unit oil loop exchanges thermal energy with the coolant loop via a transmission oil cooler; and selectively and precisely regulating a temperature of coolant passing through a radiator of the coolant loop by selectively and variably preventing a flow of ambient air through the radiator, wherein calculating a quantity of stored energy in a thermal management system further comprises:

calculating a quantity of thermal energy stored in a battery as a measure of a heat capacity of the battery multiplied by a temperature of the battery, subtracted from a temperature of coolant in the coolant loop; and calculating a quantity of thermal energy stored in the drive unit as a measure of a heat capacity of the drive unit multiplied by a temperature of oil in the drive unit oil loop, subtracted from the temperature of the coolant in the coolant loop, and wherein determining if thermal energy is needed further comprises: determining an optimal amount of regenerative braking energy such that thermal energy generated by the regenerative braking system is transferred by coolant in the coolant loop from the regenerative braking system to other thermal fluid loops and other components of the thermal management system.

12. The method of claim 11 wherein determining if thermal energy is needed further comprises determining if a passenger compartment ambient temperature change has been requested.

13. The method of claim 11 wherein determining if thermal energy is needed further comprises determining an optimal operating temperature for a motor vehicle battery, and wherein the chiller includes at least two passageways physically separated from one another, wherein a first passageway through the chiller carries coolant of the coolant loop, and a second passageway carries refrigerant as part of the refrigerant loop, and wherein the transmission oil cooler includes at least two passageways physically separated from one another, wherein a first passageway through the transmission oil cooler carries coolant of the coolant loop, and a second passageway through the transmission oil cooler carries oil of the drive unit oil loop.

14. The method of claim 11 wherein determining if thermal energy is needed further comprises determining an optimal operating temperature for a motor vehicle drive unit, wherein the drive unit includes a motor.

15. The method of claim 11 wherein determining if thermal energy is needed further comprises determining an optimal amount of electrical energy to be drawn from an electrical grid when the motor vehicle is plugged into the electrical grid and charging.

16. A method for continuously managing thermal energy in a motor vehicle comprises:

initializing a continuous thermal energy management control loop within a controller disposed in the motor vehicle;

calculating a quantity of stored energy in a plurality of dissimilar thermal fluid loops within a thermal management system equipped to the motor vehicle, each of the dissimilar thermal fluid loops having different components and carrying a different fluid, including calculating a quantity of thermal energy stored in each of a plurality of dissimilar thermal fluid loops within the thermal management system, wherein calculating the quantity of stored energy within the thermal management system further comprises:

calculating a quantity of thermal energy stored in a battery as a measure of a heat capacity of the battery multiplied by a temperature of the battery, subtracted from a temperature of coolant in the coolant loop; and calculating a quantity of thermal energy stored in a drive unit as a measure of a heat capacity of the drive unit multiplied by a temperature of oil in a drive unit oil loop, subtracted from the temperature of the coolant in a coolant loop;

calculating a quantity of thermal energy waste in the thermal management system, wherein the quantity of thermal energy waste is a sum of excess thermal energy in each component of the thermal management system;

determining if a motor vehicle operator has requested a passenger compartment ambient temperature change;

determining an optimal operating temperature for a motor vehicle battery;

determining an optimal operating temperature for a motor vehicle drive unit, wherein the drive unit includes a motor;

determining an optimal amount of regenerative braking energy;

selectively commanding at least one component in at least one of the dissimilar thermal fluid loops to generate a predetermined amount of thermal energy;

selectively transporting thermal energy to the component of the thermal management system;

determining a thermal storage capacity of the thermal management system;

determining if a thermal energy deficit exists within the thermal management system, wherein the thermal energy deficit is a quantity of thermal energy required by the thermal management system subtracted from the sum of the stored energy and the thermal energy waste;

selectively directing a flow of a thermal energy carrying fluid to a thermal energy reservoir;

selectively directing a flow of the thermal energy carrying fluid to a heat exchange device in at least one of the dissimilar thermal loops, wherein the heat exchange device is exposed to an atmosphere surrounding the motor vehicle, and wherein each of the plurality of dissimilar thermal fluid loops exchanges thermal energy with another of the plurality of dissimilar thermal fluid loops through a heat exchange device, wherein the plurality of dissimilar thermal fluid loops comprises at least: a refrigerant loop, a coolant loop, and a drive unit oil loop, and wherein the refrigerant loop exchanges thermal energy with the coolant loop via a chiller, and wherein the drive unit oil loop exchanges thermal energy with the coolant loop via a transmission oil cooler, and wherein the chiller includes at least two passageways physically separated from one another, wherein a first passageway through the chiller carries coolant of the coolant loop, and a second passageway carries refrigerant as part of the refrigerant loop, and wherein the transmission oil cooler includes at least two passageways physically separated from one another, wherein a first passageway through the transmission oil cooler carries coolant of the coolant loop, and a second passageway through the transmission oil cooler carries oil of the drive unit oil loop; and selectively and precisely regulating a temperature of coolant passing through a radiator of the coolant loop by utilizing an airflow management device to selectively and variably prevent a flow of ambient air through the radiator, and wherein determining if thermal energy is needed further comprises: determining an optimal amount of regenerative braking energy such that thermal energy generated by the regenerative braking system is transferred by coolant in the coolant loop from the regenerative braking system to other thermal fluid loops and other components of the thermal management system.

\* \* \* \* \*